(12) United States Patent
Eizik et al.

(10) Patent No.: US 9,418,157 B2
(45) Date of Patent: Aug. 16, 2016

(54) MAPPING SYSTEM FOR NOT PROVIDED KEYWORD IN SECURE SEARCH

(71) Applicant: ACRONYM MEDIA, INC., New York, NY (US)

(72) Inventors: Selina Eizik, New York, NY (US); John Peter Spear, Rockaway, NJ (US); Jonah Feld, Somerville, MA (US)

(73) Assignee: ACRONYM MEDIA, INC., New York, NY (US)

( * ) Notice: Subject to any disclaimer, the term of this patent is extended or adjusted under 35 U.S.C. 154(b) by 283 days.

(21) Appl. No.: 14/223,531

(22) Filed: Mar. 24, 2014

(65) Prior Publication Data

US 2015/0127635 A1    May 7, 2015

Related U.S. Application Data

(60) Provisional application No. 61/901,167, filed on Nov. 7, 2013.

(51) Int. Cl.
*G06F 17/30* (2006.01)

(52) U.S. Cl.
CPC .................. *G06F 17/30864* (2013.01)

(58) Field of Classification Search
CPC ................................ G06F 17/30864
See application file for complete search history.

(56) References Cited

U.S. PATENT DOCUMENTS

| 7,831,472 B2 | 11/2010 | Yufik |
| 8,515,937 B1 | 8/2013 | Sun et al. |
| 2007/0288431 A1 | 12/2007 | Reitter et al. |
| 2009/0144263 A1* | 6/2009 | Brady ............ G06F 17/30864 |
| 2012/0066211 A1 | 3/2012 | Gandhi |
| 2014/0095427 A1* | 4/2014 | Fox ................ G06F 17/30864 |
| | | 707/603 |

OTHER PUBLICATIONS

International Search Report for PCT/US2014-064227 dated Feb. 13, 2015.

* cited by examiner

*Primary Examiner* — Robert Beausoliel, Jr.
*Assistant Examiner* — Hau H Hoang
(74) *Attorney, Agent, or Firm* — Millen, White, Zelano & Branigan, P.C.; William Nixon

(57) ABSTRACT

A keyword estimation process and tool provides data for on-line visits to websites within a secure search environment. Blocks having probability mass functions are created to build a base using data from sources. The blocks include categories for keywords. Using an algorithm, the keywords for a target number of visits and other metrics may be estimated.

25 Claims, 10 Drawing Sheets

MAPPING SYSTEM FOR NOT PROVIDED KEYWORD IN SECURE SEARCH

FIELD OF THE INVENTION

The present invention relates to estimating keywords used to drive on-line traffic to a website. More particularly, the present invention relates to estimating keywords for a customer using known information and probability distributions for visits as well as dependent performance within a website.

DESCRIPTION OF THE RELATED ART

Keywords refer to search terms used for on-line searching. A user may type in one or more words, a phrase and the like. A search engine returns a plurality of links to webpages, usually ranked according to some criteria or algorithm. The user views the resulting links and selects one to visit that webpage. The words or phrase used to perform the search may be of interest to companies hosting the webpage, providing services on-line, retailers, and the like.

Search engine optimization (SEO) is the process of impacting the visibility of a website from such search results. The visibility of a website is increased by ranking higher within the search results. A retailer, for example, would very much want to be on the first page, if not in the top 5 links, to significantly increase its chances of driving traffic to its website. In doing this, the retailer would need to know what search terms best give it that opportunity to be ranked high. Optimization of its rankings may involve editing its content, HTML, and associated coding to increase its relevance to these keywords.

For example, a well-known national retailer may sell many products, such as plasma televisions. A keyword for such an item may be "plasma TVs," which is used by many users well-known search engines. If the retailer wants to have their webpage displayed when people search for plasma televisions, then it would ensure that the product descriptions on their website use this keyword, as well as other similar keywords, to rank high in the search. It also would want associated social media content to utilize the keyword. Thus, the retailer seeks to make sure its marketing messages and content reflect the language, terms, phrases, words, etc., that customers and prospects use while searching.

The keyword information may come from searches done on well-known search engine websites. Recently, however, Google™ search and other search engines have begun using secure sockets layer (SSL) to encrypt the connection between a computer used to enter the search terms and the search engine to help prevent intermediary parties, like internet cafes, internet service providers, and trolls on Wi-Fi hotspots, from intercepting or interfering with search activities. This feature provides a more secure and private search experience. Most search engines allowed for secure searches for users signed into their registered accounts, such as Google™, Yahoo™, and the like. Thus, if a user searches on Google™ while logged into his/her Google™ or Gmail™ account, then the search would be secure using SSL. None of the search information, including the keyword(s), would be made available to third parties. A trend among big search engines is to make all searches use SSL, even if not logged into an account. The implication of this trend is to no longer generate or provide keyword search data to websites.

The non-availability of the keywords represents a significant change for on-line marketing. For a company website, the retailer can no longer see which keywords are being used to find its site. The knowledge of keywords is vital to on-line marketing because that is how one knows what prospects and customers are searching when they arrive at one's virtual doorstep. In other words, when a search engine applies the SSL process to searches, the retailer would not know which keywords are driving traffic to its webpage. The retailer would be blind and have to try various keywords and phrases, and measure over a long period of time what may or may not be effective. Deciding which keywords to optimize for content on their website and social profiles, would be nearly impossible. This process is ineffective in real-time, which is what on-line companies require for marketing.

SUMMARY OF THE INVENTION

The disclosed embodiments provide keyword estimation that incorporates probabilistic assessments of potential keywords responsible for driving known performance values. A secure search using SSL prevents the referring keyword from being known. Thus, one may not know the keyword that leads to a visit to one's website. Other details, however, about the visit may be known, such as performance, referring engine, entrance page, and the like. The disclosed embodiments use the known information to estimate the unknown keyword used in a search.

The disclosed embodiments may receive or access a large number of stratified samples derived from a known keyword activity base. Preferably, the large number may be in the thousands. The disclosed embodiments then use these samples to iteratively build results. The results are superior to deterministic estimates used elsewhere, both in terms of accuracy and reduced dependence on third party data sources. While other processes guess the keywords and then estimate performance, the disclosed embodiments of the present invention allocate the performance to probabilistically selected keywords.

Accordingly, a method for performing keyword estimation is disclosed. The method includes matching a target to at least one block. The target relates to visits to a uniform resource locator (URL) address. The method also includes performing a probabilistic assessment on the target using the at least one block. The method also includes determining at least one keyword application to the URL address using the probabilistic assessment.

A method for estimating a keyword for a website also is disclosed. The website includes a uniform resource locator (URL) address. The method includes receiving a plurality of visits to the website. The method also includes matching the plurality of visits to a block. The block includes at least one category related to the URL address. Each of the at least one category includes a probability value. The method also includes determining a random number for each visit. The method also includes determining an estimated keyword based on the random number and the probability value of a category within the block.

A method for estimating a keyword for a website visit also is disclosed. The method includes assigning a random number to a visit. The method also includes comparing the random number to a category within a block related to the website. The method also includes determining an estimated keyword according to the category.

A computer system for performing keyword estimation for a website also is disclosed. The website includes a uniform resource locator (URL) address. The computer system includes a database configured to store keyword data from one or more sources. The computer system also includes a target corresponding to a plurality of visits to the website. The computer system also includes a keyword estimation module configured to receive the plurality of visits and to estimate at least one keyword for the plurality of visits using a probabilistic assessment and at least one category within a block. The keyword estimation module includes a random number generator and an aggregator.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

Figure 1:
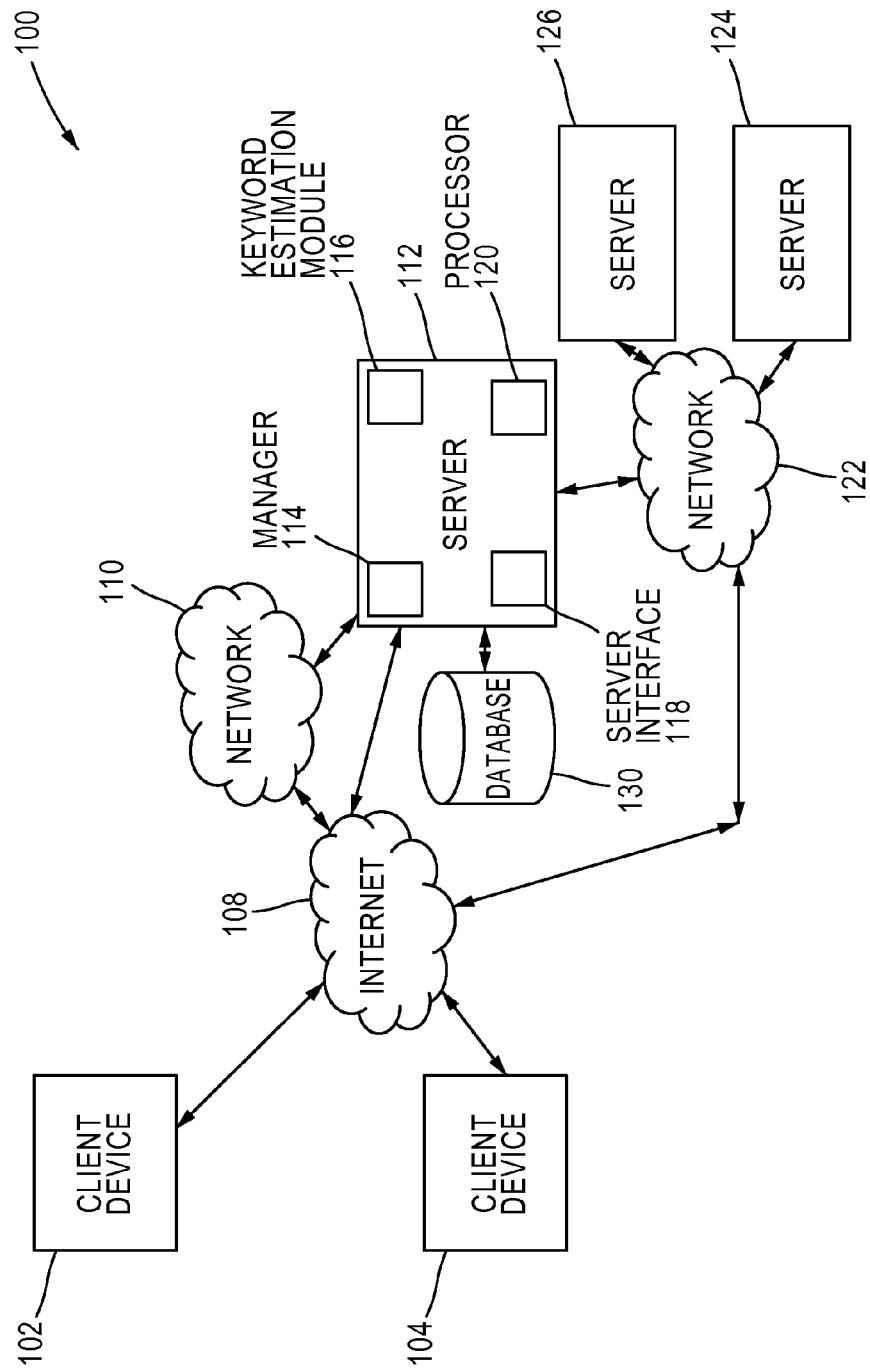
FIG. 1 illustrates a client-server environment for a keyword estimation system according to the disclosed embodiments.

FIG. 1 illustrates a client-server environment for a keyword estimation system according to the disclosed embodiments. A client-server wide area network system 100 is shown. System 100 includes client devices 102 and 104 that host or execute applications. Clients 102 and 104 can achieve a connection to other networks such as network 110 and to servers such as server 112.

System 100 utilizes the Internet 108, which may include a global internet formed by logical and physical connections between multiple wide area networks or local area networks. Internet 108 may refer to the World Wide Web ("Web") that includes a system of interlinked hypertext documents accessed via Internet 108. Alternatively, system 100 may include one or more RF networks or one or more wired or wireless networks. System 100 also includes a number of servers, some of which are shown in FIG. 1, that enable one type of network to interface with another type of network.

Server 112 connects to database 130 and to other networks such as network 122. Server 112 can include an applications manager 114, a keyword estimation module 116, a server interface 118, and a processor 120. Network 122 may connect to server 124 and a server 126 such that many different functions may be provided to a client device via selectable links having network addresses. In some embodiments, servers 124 and 126 may represent search engine servers storing search engine results. These results may be collected by searches completed on devices connected to Internet 108, such as devices 102 and 104. System 100 may include any number of servers connected through networks that are accessible by server 112.

Server 112 may be a digital content server that includes computer programs, managed by manager 114, that are responsible for accepting requests from client devices 102 and 104, and providing the results as hypertext transfer protocol (HTTP) response along with optional data contact that includes HTML documents and linked objects for display to the user. Server 112 also may include the capability of logging some detailed information about client requests and responses to files stored onto database 130. Digital content may include a website, webpages, blogs, microblogs, posts, videos, images, emails, chat messages, and the like that can be indexed and available over system 100.

Keyword estimation module 116 is shown as residing on server 112. This embodiment is depicted as one accessible from client devices 102 and 104 to use the functionality of module 116, disclosed in greater detail below. Alternatively, module 116 may be used and the results sent to client devices 102 and 104. Keyword estimation module 116 may provide the keyword estimation results disclosed in greater detail below after executing the disclosed processes and receiving information from sources attached to system 100, such as servers 124 and 126.

Processor 120 may execute instructions as directed by keyword estimation module 116, and process data coming from sources within system 100. Once module 116 is finished with its processes, the results may be provided to other components within system 100. For example, a user at client device 102 may receive the keyword estimation results after running the disclosed process using information collected from servers 124 and 126.

Figure 2:
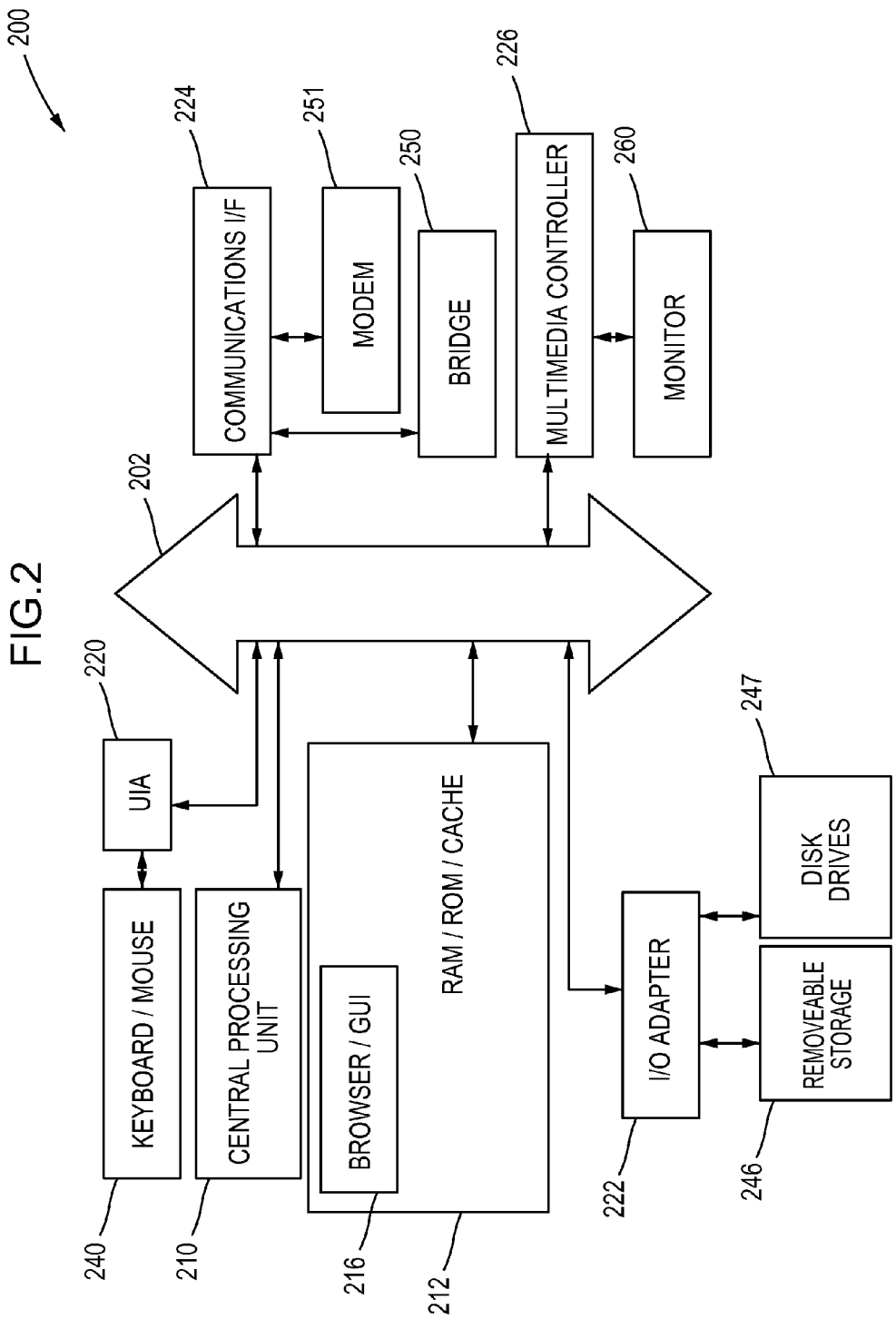
FIG. 2 illustrates a block diagram of a processing device utilized to provide the keyword estimation methods according to the disclosed embodiments.

FIG. 2 depicts a block diagram of a processing device 200 utilized to provide the keyword estimation methods disclosed herein. Device 200 may execute an entire suite of computer programs to provide the functionality disclosed below to allow for the estimation of keywords within an environment having SSL. Device 200 may be a computer that can access networks, but workstations, platforms, smart phones, tablets, smart televisions, or another other processing device would not part from the scope of the disclosed embodiments. Device 200 may relate to client devices 102 or 104, or to server 112.

The configuration of device 200 disclosed below is for illustrative purposes only, and may be used to configure device 200 into a special purpose machine to estimate keywords. The components disclosed below may be used to provide the functionality outlined in greater detail by the accompanying figures. Keyword estimation module 116 may operate within this special purpose machine, but is not limited to the configuration shown in FIG. 2.

Processing device 200 includes a processor 210. Processor 210 may be a conventional data processor, memory including random access memory (RAM), read only memory (ROM) and cache memory 212, and input/output adapter 222, a user interface adapter (UTA) 220, a communications interface adapter 224, and a multimedia controller 226. Processor 210 executes instructions to perform functions or processes. Thus, software instructions may configure processor 210 to perform a specific function to accomplish a specific goal. These functions are disclosed in greater detail below.

Input/output (I/O) adapter 222 can be connected to, and control, disk drives 247, and removable storage devices 246. User interface adapter 220 can be considered to be a specialized I/O adapter. Adapter 220 is connected to a mouse and a keyboard 240. In addition, user interface adapter 220 may be connected to other devices capable of providing various types of user control, such as touch screen devices, track balls and pads, and the like.

Communications interface adapter 224 can be connected to a bridge 250 for a local or wide area network, and a modem 251. Modem 251 may be internal or external. By connecting system bus 202 to various communication devices, external access to information on a network may be achieved. Multimedia controller 226 may include a video graphics controller capable of displaying images upon monitor 260, as well as providing audio to external components, such as speakers connected to processing device 200.

A graphical user interface (GUI) module 216 can be connected to a browser, such as browser 106, to control features and content provided on monitor 260. GUI 216 also may connect to system bus 202 to provide logic or instructions to facilitate a user-browser interaction associated with retrieval of websites and information. Central processing unit 210 can execute functions and provide useful interaction tools to a user during searches and retrieval over Internet 108, and during the submission of collections.

In operation, a user operating device 200 can utilize GUI 216 to retrieve content from a remote server or server 112. The retrieved content may be stored locally, in RAM/ROM/cache memory 212 or on disk drive 247. This content may be made available to the user. Using GUI 216, the user may add content or modify existing content.

After the content of a webpage is received by device 200 via communications I/F 224, and is displayed by monitor 260, a user may attempt modify the displayed contents utilizing browser 216. These modifications may be stored in memory 212. Upon completion, the modified content may be sent back to server 112.

Figure 3:
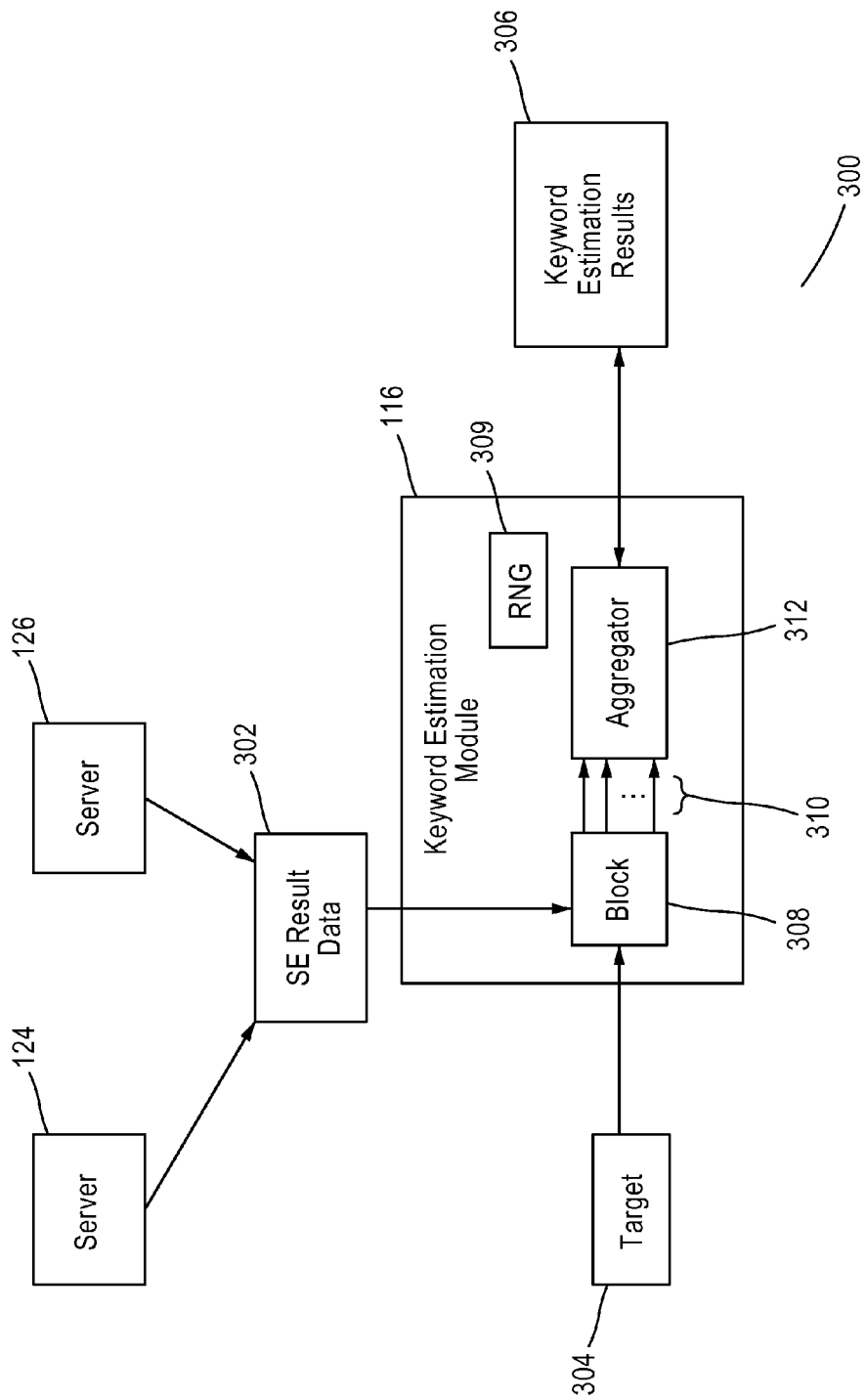
FIG. 3 depicts a block diagram of a process flow environment of a keyword estimation module according to the disclosed embodiments.

FIG. 3 depicts a block diagram of a process flow environment 300 of keyword estimation module 116 according to the disclosed embodiments. Environment 300 may be implemented using system 100 or device 200 disclosed above. Keyword estimation module 116 receives data from existing sources, and uses this data to create blocks 308. Blocks are disclosed in greater detail below. A single block 308 is shown in FIG. 3, but module 116 may include any number of blocks. Using the disclosed algorithms, module 116 generates keyword estimation results 306. A user interested in improving their search engine ranking may use the estimated keywords upon his/her website.

Search engine result data 302 is retrieved from servers 124 and 126, which may be referred to as "sources" for the data. Search engine result data 302 may relate to search engines providing non-secure searches, and includes keyword level detail. Server 124 may store this data for one search engine while server 126 stores it for another. The results data also may be known as keyword data. Data 302 is shown as combined for simplicity only, and the data does not need to be combined before used by keyword estimation module 116.

Search engine result data 302 is used to create one or more blocks 308. A block is disclosed in greater detail below. Blocks 308 may comprise a base used by keyword estimation module 116.

Environment 300 also includes target 304. Target 304 may refer to a collection of visits having an unknown referring keyword. The collection of these visits in the estimation queue is the target. In other words, target 304 is the number of visits to account for. Target 304 may be set by the system, such as 10,000.

Keyword estimation module 116 receives the visits of target 304, and processes them through one or more blocks 308 to produce estimated keywords 310. As a visit of target 304 is placed through block 308, an estimated keyword is assigned to it. A random number generator 309 may be used to facilitate this process, as disclosed in greater detail below. Preferably, a plurality of estimated keywords may be determined by module 116. Keywords 310 are then placed together by aggregator 312. Aggregator 312 may enable additional functionality for the estimation process. Aggregator 312 generates keyword estimation results 306, which then may be used much like SEO keywords compiled in unsecure search engine results.

Figure 4:
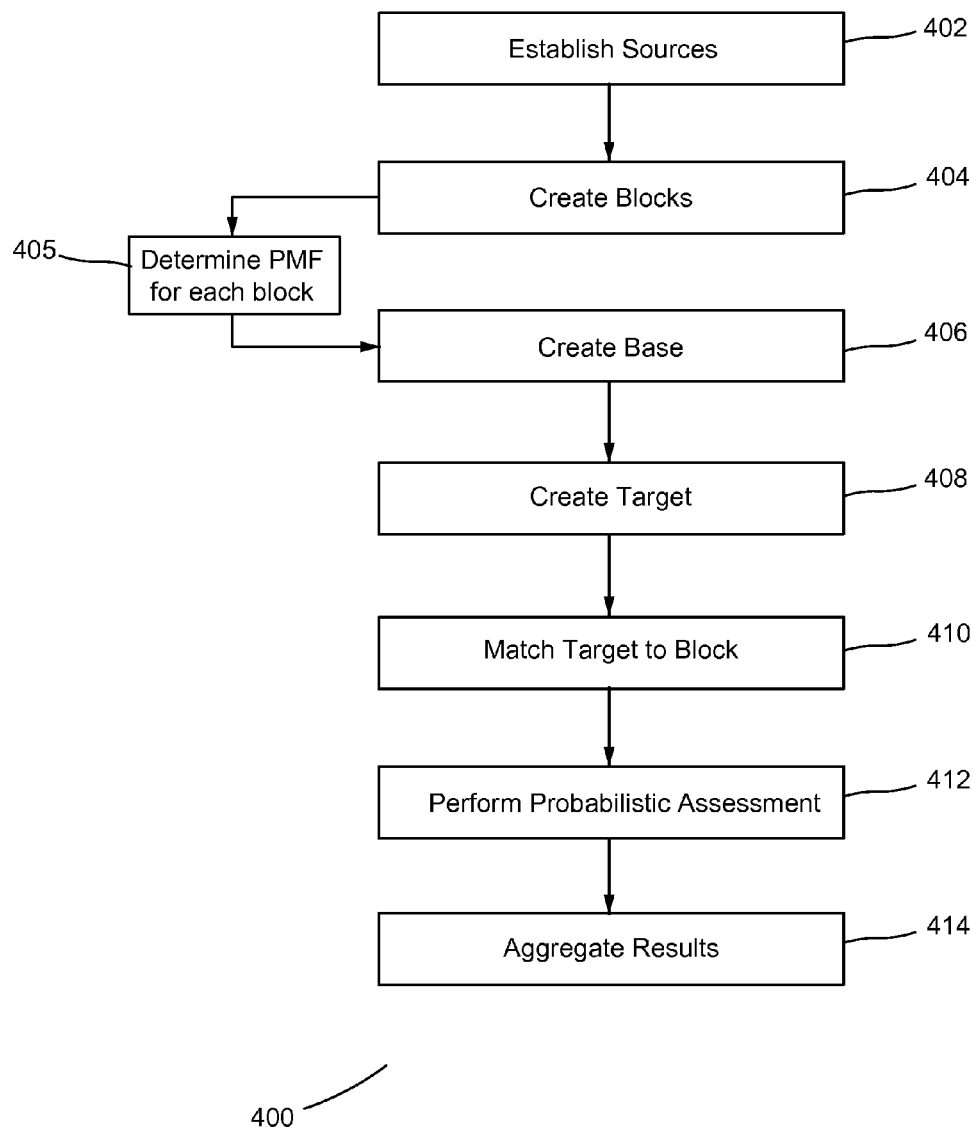
FIG. 4 illustrates a flowchart for visit estimation according to the disclosed embodiments.

FIG. 4 depicts a flowchart 400 for visit estimation according to the disclosed embodiments. Visit estimation is a prerequisite for estimation of all other quantitative performance activities. Session details are not required to provide these estimations. Performance metrics may be dependent on each other, but visits must be estimated first.

Referring to flowchart 400, a process for estimating keywords driving visits to a webpage or website is disclosed. Step 402 executes by establishing sources of data for the estimation process. Sources contribute data for building blocks, such as servers 124 and 126 disclosed above. The data includes keyword level details from the source. For example, a source may include a search engine providing non-secure searches that collect keyword level details. Other third parties may be sources. In fact, a source may include any source of historical keyword data. The keyword level detail and data are independent of any assessment or speculation on the keywords used in the searches.

Step 404 executes by creating blocks using the keyword data provided by the sources. Visit estimation begins with the construction of "blocks." Each block represents a known sample of visits with known keywords. The keywords preferably originate from visits with similarities to each other. Similarities refer to dimensional commonalities. For example, multiple keywords with a single entrance URL are deemed similar. Examples of other dimensions that may denote similarity include, but are not limited to, time, region, country, device, and referring engine. When blocks are sufficiently large, these may be split by considering multiple dimensions. For example, if a block containing a web site's homepage is sufficiently large, the block may be split by country of origin, thereby yielding one block for each country. The building of blocks is data driven. As the source data increases in their richness, the more discriminating each block will be, and ultimately, the more blocks will be created. The total population of keywords may be known and unknown from which each stratified sample, or block, is comprised.

Thus, a block may be a profile of certain visit characteristics. Visit similarity is determined primarily by entrance page and date, but this factor is not limited to these characteristics.

Step 405 executes by creating a single probability mass function to each block. Thus, a block constitutes a probability mass function for the discrete categorical distribution of keywords for the visit data provided by one or more sources. A block, according to the disclosed embodiments, includes a dynamic number of categorical possibilities. The probability mass function is not required to be unique to the block, but is constructed independently for each block. Historic visit activity is the primary driver in building the probabilities.

This feature may be best represented by Table 1 below. Table 1 represents a block of the likelihood of referring keywords for similar users are:

TABLE 1

| Index | Keyword | Visit Probability $p_i$ |
|---|---|---|
| 1 | notel motels Chicago | .8 |
| 2 | notel motel in Chicago | .1 |
| 3 | chicago notel address | .1 |

The probabilities are determined by dividing the visits for a single keyword within the block by the sum of all visits within the block. In Table 1 above, the visits contributing to the construction of the block may be 8, 1, 1, or some multiple thereof. The number of categorical possibilities is represented by k. Here, k is 3. The block may relate to visits entering on the website www.notelmotels.com/chicago in late June 2012, referred from a known search engine. The number of visits may be any number to provide the distribution. The keywords, or possibilities, relate to each other, or have similarities, by virtue of being contained within a single block. The probability distribution, moreover, is not uniform, and may be represented by $p_i$. Accordingly, the sum of all probabilities is 1.

The definition of each block is independent of the disclosed estimation routine. In other words, each block is built one at a time, and without regard for any desired keywords. The data received drives the building of the block. Further, not all blocks are required to be used in the estimation of referring keywords for a given period, day or time.

Figure 5:
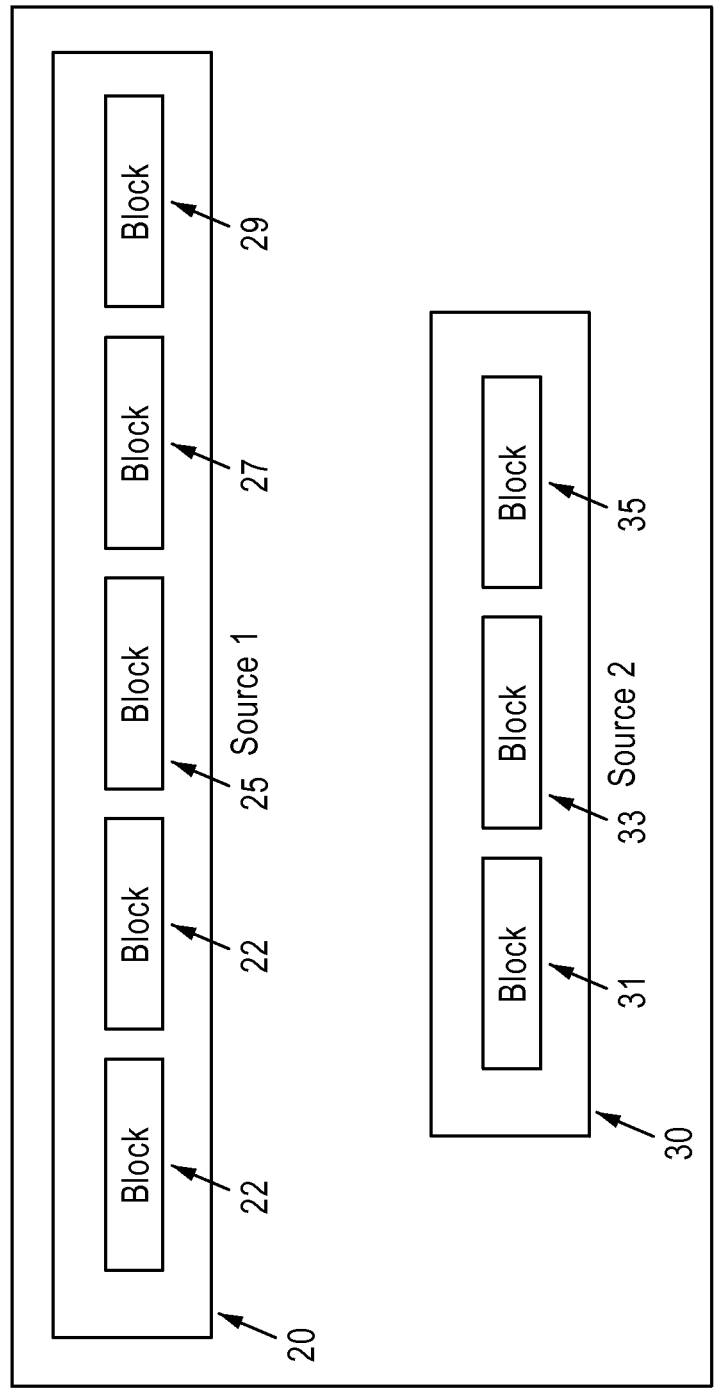
FIG. 5 illustrates a block diagram of the data used to facilitate the keyword estimation process according to the disclosed embodiments.

The relationship of blocks and sources may be better represented by FIG. 5. Within the figure, information may be received having data pertaining to visits to a website. FIG. 5 shows one group of visit profiles, but may include a plurality of groups of visit profiles. The visit profile 2 may represent the visits having defined parameters, like those disclosed above for the block of Table 1.

Sources 20 and 30 may provide the data, as disclosed above, for visit profile 2 meeting the defined parameters. For example, source 20 may be a non-secure search engine and source 30 may be compiled data made available by a third party on visits to the website during a period of time. As shown, sources 20 and 30 facilitate the building of blocks having probability mass functions for the keywords used to prompt the visits. One skilled in the art can appreciate that the disclosed embodiments are not limited to two sources, but any number of sources may be represented as providing data for visit profiles 2.

Blocks are built from these data. Thus, blocks 22, 23, 25, 27 and 29 may be built with the data provided from source 20. Blocks 31, 33 and 35 may be built with the data provided from source 30. As can be seen, the number of blocks generated from the data is not the same across sources. Some sources may not have any data applicable to another source's block.

Each block may receive contributions from one or more sources. Sources provide keyword level detail to be considered for block building. Each source contributes to one or more blocks. Preferably, the number of blocks from a source may be in the thousands to provide a large distribution. As noted above, sources with keyword level details that remain accessible from non-secure searches are the primary contributors.

Referring back to FIG. 5, source 20 and source 30 include blocks. Referring to Table 1, the various blocks spread across the sources may resemble the categories, k, shown, with their own statistical probably values. Thus, using the example, block 22 may have the 0.8, 0.1, and 0.1 breakdown shown in Table 1 while block 31 has a different breakdown within the categories, or different categorical results entirely. The blocks may be related in some manner, but it is not required.

Figure 6:
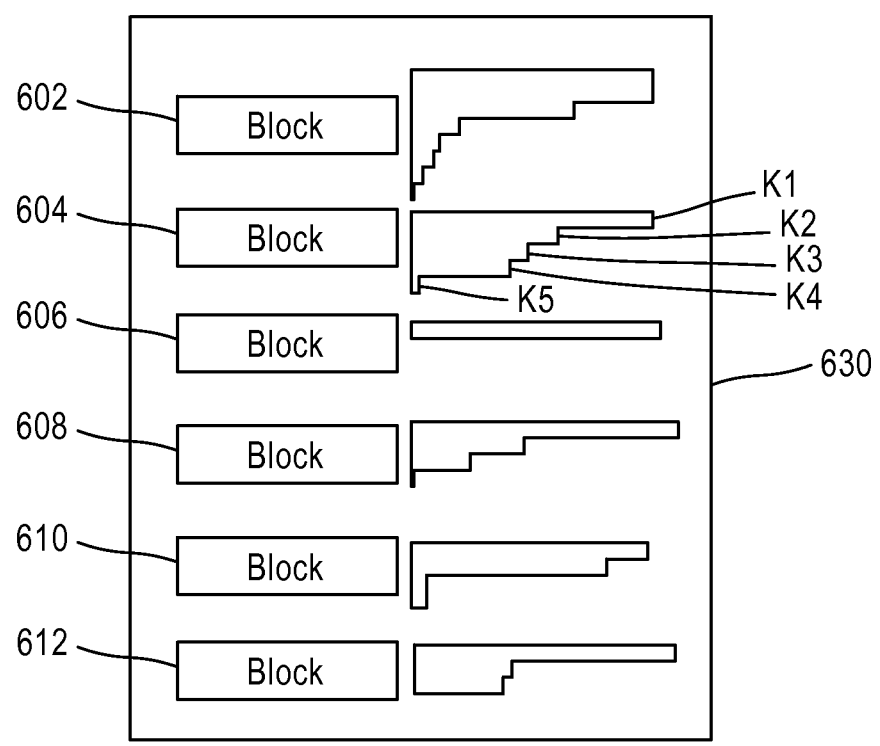
FIG. 6 illustrates a block diagram of probability mass distributions of blocks according to the disclosed embodiments.

FIG. 6 depicts a block diagram of a plurality of blocks having probability distributions for a number of keywords according to the disclosed embodiments. Blocks 602 to 612 are shown with their respective distributions for keyword categories found in each block. Blocks do not have a uniform number of keywords. For example, block 602 includes 8 keyword categories, block 604 includes 5 keyword categories, block 606 includes 1 keyword category, blocks 608 and 610 include 4 keyword categories and block 612 includes 3 keyword categories.

The bars associated with each block represent the visit probability for each keyword within the block. Referring to block 604, keywords k1-k5 are shown. Keyword k1 may have the largest probability value for the keywords within the block. The remaining keywords are ranked as shown, with keyword k5 having the lowest probability. These probabilities correspond to the values for $p_i$ of Table 1 above. The sum of these values, or distributions, for keywords k1-k5 is 1. The visits to the URL reflected in block 604 may be associated with one of the five keywords.

Block 606 may have only one keyword, so that every visit includes this keyword. Block 610 shows an example of two keywords having the same probability. In some embodiments, the keywords may be the same across blocks 602-612.

Referring back to FIG. 4, step 406 executes by creating a "base". A collection of all blocks may be known as the "base." The base represents the collection of all the probability mass functions for all possible blocks. FIG. 6 shows an example of the probability mass functions across a plurality of blocks 602-612. The theoretical limit for the number of blocks in the base is $d_1 * d_2 * \ldots d_n$, where d represents a considered dimension. For example, a site with 1,000 visits from 5 countries would have an upper limit of 5,000 blocks if 2 dimensions were being considered. In its most simple application where only a single dimension is considered in block construction (URL is the first dimension considered), the number of blocks will be equal to or fewer than the number of URLs on the site. In this example, the number of blocks would be 1,000. Referring to FIG. 6, all the blocks shown may be included in a base 630.

Step 408 executes by creating a target for the estimation process. Each visit with an unknown referring keyword is queued for estimation. The collection of all visits in the estimation queue may be known as the "target." In other words, the target is the number of visits to account for. The target may be set by the system, such as 10,000. Each visit in the target preferably is assigned to one block for a probabilistic assessment. Some visits may not be assigned, and will proceed through as an unknown. The comprehensiveness of the target depends on the full integration with web analytics data.

Step 410 executes by matching the targets to a block. Each visit in the queue is matched to a block based on attributes deemed to be similar to the block. For the purpose of matching visits within the target to the block, all dimensions considered in the construction of the block must be available for evaluation in the visit target. These factors may include country/region/state/county/postal code, location of search, referring device, age of user (if known), and the like. The visit is matched to the best block that represents the factors. For example, a block with dimensional attributes of:

entrance URL=www.notelmotels.com/chicago;
    Date=June 2012;
    device=mobile would be a perfect match for a visit target within the queue containing identical dimensional attributes. If, however, the visit target being considered had an attribute of entrance URL=www.notelmotels.com/baltimore, it would be matched to a different block. Similarly, if they visit target being considered had a missing device attribute, it would be ineligible for such a narrowly defined block. A match would be considered to a more permissive block with fewer dimensional requirements. Each visit target can be matched to no more than one block. Visits in the queue that cannot be matched to a block are passed through to results as in, without estimation.

Step 412 executes by performing the probabilistic assessment on the visit. The visit is probabilistically allocated according to the distribution in the block. A visit is indivisible (there cannot be a 0.8 visit). The entire visit, but not other performance metrics, gets attributed to one keyword or category within the block. This feature helps to preserve the long tail of referring keywords.

The visit is assigned a random number. The random number may be generated in any number of ways, and may be any number. For example, the random numbers for a visit within the target matched to the block shown in Table 1 may be 0.0, 0.1, 0.2 . . . , 0.9, or may be 0.00, 0.01, 0.02, 0.03 . . . , 0.99, and the like. This randomization step makes the estimation process non-deterministic, and permits allocation to mimic probabilistic distributions over time. The random number is compared to the discrete probability distribution, resulting in the selection of a keyword to receive credit for generating the visit. This action is repeated for all visits matched to each block.

The disclosed embodiments may, at this point, index unique probabilities to enhance algorithm performance. Using the example shown in Table 1, indexing the categories may reduce the block calculation to the values shown in Table 2 below:

TABLE 2

| Index Group | Visit Probability Σ pi |
|---|---|
| 1 | .8 |
| 2, 3 | .2 |

All categorical possibilities, k, within a given index group have equal probabilities. Here, index groups 2 and 3 have 0.1 visit probabilities. Indexing creates many uniform distributions with k greater than or equal to 1 from the block's probability mass function. Once an index group is selected, a random index member is chosen as the result. The indexing provides a performance benefit to the disclosed embodiments, but is an optional feature of the disclosed estimation process.

Figure 7:
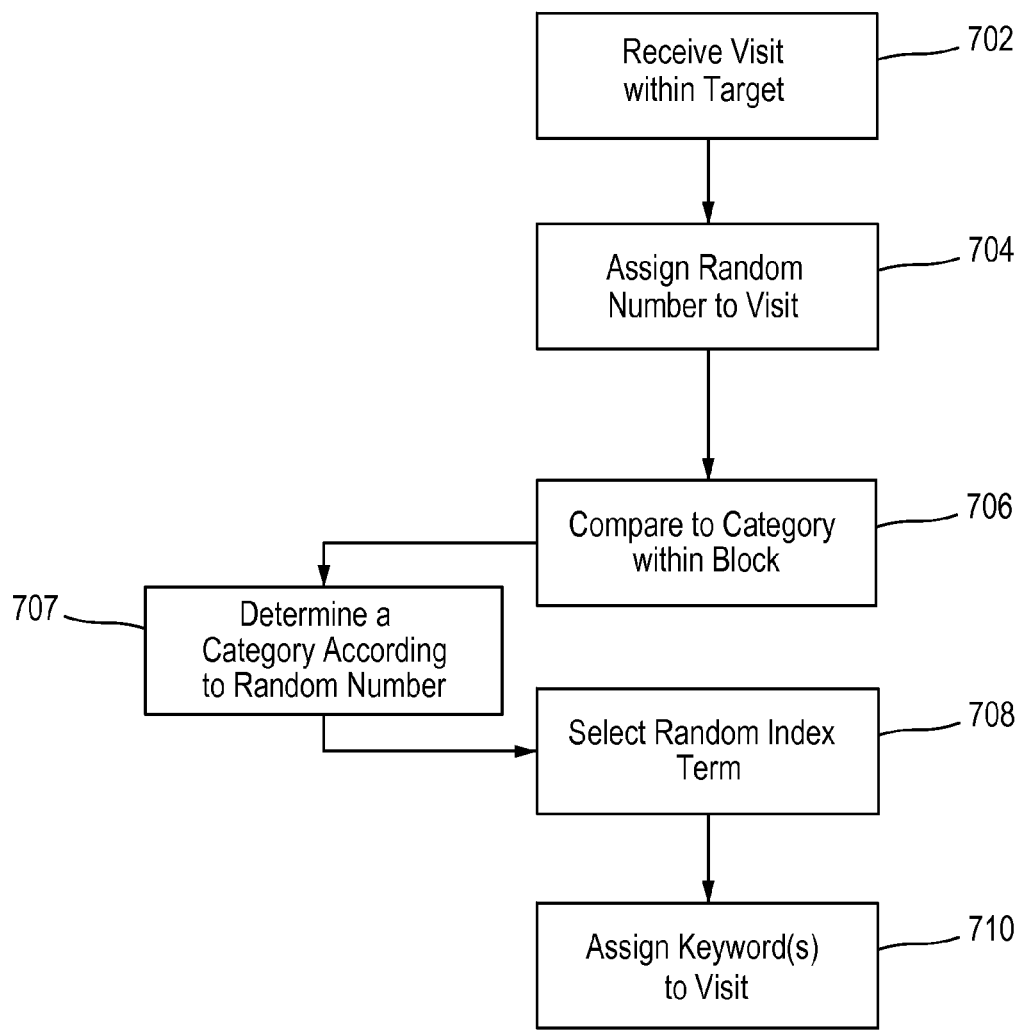
FIG. 7 illustrates a flowchart for performing a probabilistic assessment according to the disclosed embodiments.

FIG. 7 depicts a flowchart 700 for performing a probabilistic assessment according to the disclosed embodiments. FIG. 7 may define step 412 in greater detail, but step 412 is not limited to the steps shown in FIG. 7. FIG. 7 shows some embodiments of determining a probabilistic assessment in order to estimate a keyword for a visit.

Step 702 executes by receiving a visit within a target group. Preferably, the visit relates to a block as created above. Step 704 executes by assigning a random number to the visit. For example, random number generator 309 within keyword estimation module 116 may be used to provide a number for the visit. Step 706 executes by comparing the random number for the visit to a category in the block. As disclosed above, the block includes a probabilistic mass function. The random number is placed through this function to correspond to a category within the block. Using the example shown in Table 1, a random number for a visit of 0.5 will correspond to the first category within the block, or the keywords "notel motels Chicago." Step 707 executes by determining the category within the block according to the random number.

Step 708 executes by selecting the random index term, if applicable. As disclosed above and shown in Table 2, categories having the same probabilities may be indexed to improve algorithm performance. If the random number indicates this category, then one of the terms is selected randomly. Using the example shown in Table 2, if the random number is 0.9, then the keywords from category 2 to 3 would be selected. Step 710 executes by assigning the keyword or keywords to the visit. This process may be repeated until all visits within a target have been assigned a keyword(s).

Referring back to FIG. 4, step 414 executes by aggregating the results of the estimations. The sum of the visit estimation results should be equal to the sum of visits in the target. This key distinguishes the disclosed estimation algorithm from those algorithms that seek to test keywords and estimate performance. The disclosed algorithm knows the performance and allocates it to the keywords. Results of the visit estimation are loaded into a reporting tool for dissemination, but are distinguishable from non-estimated results. An example of such a reporting tool may be Keyword Objects™.

Another example may better illustrate the disclosed estimation process. After the target is reached, four visits may be allocated to the block shown in Table 1. The split of the four visits does not match precisely with the 0.8, 0.1 and 0.1 probabilities of the block. Thus, for each visit, a random number is assigned and an estimated keyword determined. The result for the 4 visits may be "notel motels Chicago" keywords estimated for 3 visits and "notel motel in Chicago" estimated for 1 visit. Alternatively, it may be 4 estimates for "notel motels Chicago," and no estimates for the other categories.

Figure 8:
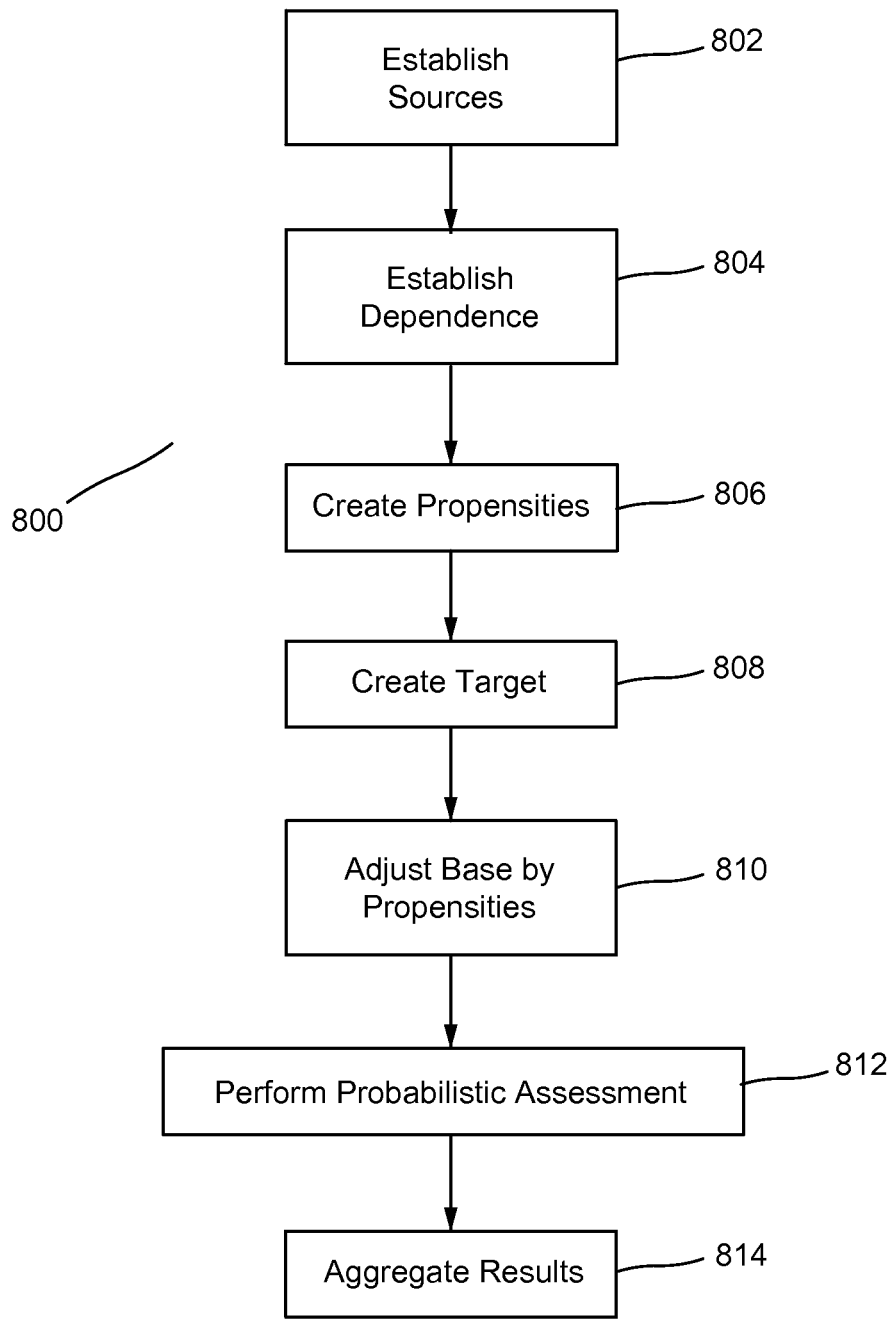
FIG. 8 illustrates a flowchart for non-visit estimation according to the disclosed embodiments.

FIG. 8 depicts a flowchart 800 for estimating the quantity of non-visit metrics attributable to estimated keywords for a webpage or website according to the disclosed embodiments. The estimation of non-visit metrics is similar to the visit estimation processes disclosed above, but with some differences. Visit estimation is the allocation of visits to thousands of keywords from thousands of categorical distributions. The disclosed algorithm is choosing members within a dimension. Non-visit estimation is the allocation of dependent performance values to keywords, such that the disclosed algorithm is distributing metrics.

Step 802 executes by establishing sources. Like blocks, propensity sources are not limited by definition. Preferably, web analytics are the propensity source. The duration interval is dynamic for the propensity source, and it is not required to be identical to the duration interval used in the construction of the base for keyword visit estimation, as disclosed above. A sufficiently large interval to yield results is more important than an identical interval used for visit estimation.

Step 804 executes by establishing dependence. All non-visit metrics are dependent on at least one other metric. Dependence tables are independent to each site being considered, and are established during a configuration with human consultation. Dependence tables are simple and short; they contain all non-visit metrics being estimated and precedent activities within a site. Each non-visit metric appears exactly once within column c of the table. A complete dependence table for Notel Motels is provided in Table 3 below:

TABLE 3

| Index | c | d |
|---|---|---|
| 1 | Pageview | Visit |
| 2 | Availability Check | Visit |
| 3 | Booking | Availability Check |
| 4 | Revenue | Booking |

The dependent metric (often a conversion) is represented by c. The precedent metric is represented by d. As the dependent metric, c can never represent a visit. In the algorithm below, c is the numerator and d is the denominator. Table 3 provides the c/d pairings typical for a case, such as shown in Table 1 above, for Notel Motels. Table 3 shows the chained dependence for c. For example, one cannot arrive at booking without first going through availability check, or revenue without first visiting booking. It would not help the overall estimation process to allocate these metrics using the same methodology as was applied for visits when establishing probabilities. In fact, doing so would be detrimental to the estimation process.

Step 806 executes by creating, or building, propensities for the categorical distribution of keywords within the block. Because the likelihood of any event c is influenced in large part by the intent of the user, the disclosed algorithm uses keywords as a proxy for the user's intent. Visit blocks cannot be reused as proxies for intent because all visits matched to a single block would have identical intent regardless of keyword diversity within the block. In short, keywords do not have a uniform distribution to convert from d to c; they have varying levels of propensity. For example, the fictional keyword 'book weekend in notel motel Chicago' may have a higher propensity to result in a booking than the keyword 'notel motel driving directions'. Unlike blocks, which contain one or more dimensional attributes and a discrete probability distribution for keywords within the block, the propensity table has no dimensional attributes other than keyword.

Accordingly, the resulting propensity table is a massive set of all keywords with ratios for c/d pairing and n observations. Referring to Table 4:

TABLE 4

| Index | Keyword | $(c:d)_1$, n | $(c:d)_2$, n | $(c:d)_3$, n | $(c:d)_4$, n |
|---|---|---|---|---|---|
| 1 | notel | 4.6200, 148551 | 0.3158, 148551 | 0.0171, 46912 | 1,794.0599, 802 |
| 2 | notel motels | 7.1400, 18565 | 0.5093, 18565 | 0.0141, 9455 | 2,105.4143, 134 |
| 3 | notel motels chicago | 5.5900, 2101 | 0.5445, 2101 | 0.0358, 1144 | 949.3412, 41 |
| 4 | notel motels sydney | 4.9300, 2061 | 0.4158, 2061 | 0.0421, 857 | 1,136.1336, 36 |
| 5 | notel motels costa rica | 6.9300, 1800 | 0.6328, 1800 | 0.0062, 1139 | 4,725.0000, 7 |
| 6 | notel motels maldives | 6.7200, 1418 | 0.6439, 1418 | 0.0033, 913 | 6,208.6533, 3 |
| 7 | notel motels san francisco | 4.2100, 1216 | 0.3939, 1216 | 0.0460, 479 | 1,169.9114, 22 |

Referring to Table 4, a uniform likelihood does not exist that a user using "notel" as a keyword will book, given that the user has checked availability, as another user using "notel motels" having also checked availability.

Thus, column 1 of Table 4 includes c:d1, n, which may represent the proportion of page views per visit, with n being the number of visits. Column 2 of c:d2, n may represent the proportion of availability checks per visit. Column 3 of c:d3, n may represent the proportion of bookings per availability check. Column 4 of c:d4, n may represent the revenue per booking. These proportions are used to create a new probability mass function, as described in Step 810 below.

Step 808 executes by creating a target for estimation. All visits that were queued for visit estimation are queued for non-visit estimation. This may occur once for each numerator metric, or all values of c. The sums of the collections of all c metrics in the estimation queue are the "target." The comprehensiveness of the target depends on full integration with web analytics data.

Figure 9:
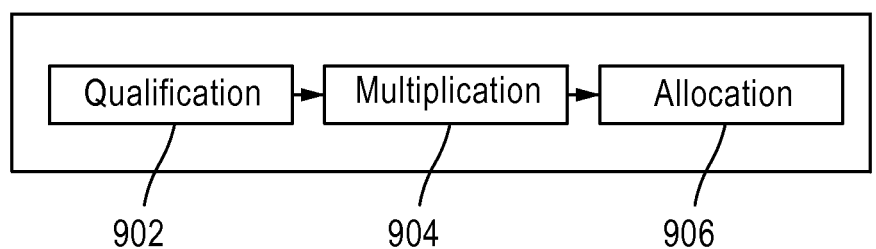
FIG. 9 illustrates a block flow diagram for creating a new probability distribution according to the disclosed embodiments.

Step 810 executes by combining the visit probability distributions in the blocks within the base with the propensities to create one new probability distribution for each item of c within the dependence table. This is done through an iterative series of sub-steps of qualification, multiplication, and allocation, as shown in FIG. 9.

Consider Table 1 mentioned above, and the resulting allocation of visits within the block as described within step 412. Combining propensities on a per keyword basis would yield a table similar to Table 5 below. Propensities for keywords not originally contained within the block are not considered as executed by qualification step 902. Visit probabilities are 0.8, 0.1, and 0.1 for visits and total visits are 1000 for the example used in constructing the propensities table below.

TABLE 5

| Index | Keyword | Allocated Visits | $(c:d)_1$, n | $(c:d)_2$, n | $(c:d)_3$, n | $(c:d)_4$, n |
|---|---|---|---|---|---|---|
| 1 | notel motels Chicago | 16 | 5.5900, 2101 | 0.5445, 2101 | 0.0358, 1144 | 949.3412, 41 |
| 2 | notel motel in Chicago | 3 | 7.1400, 714 | 0.5093, 714 | 0.0141, 9455 | 949.3412, 14 |
| 3 | chicago notel address | 2 | 3.3000, 330 | 0.1445, 330 | 0.0158, 1144 | 949.3412, 11 |

Each metric in the target is calculated from within its block. The metric, such as a probability for a category, uses the propensity table value, multiplied by d, to generate new probability mass functions. Multiplying the table by the precedents permits allocation of non-visit metrics. In the case of Table 5, the disclosed embodiments are ready to multiply by the only known precedent, Visits, to create a new probability distribution, before a subsequent round of allocation must be done. This results in multiplying Allocated Visits by $(c:d)_1$ and multiplying Allocated Visits by $(c:d)_2$. When n is sufficiently small, and c/d is 0, then the population sample mean of c/d is used to prevent a misinterpretation of a small sample as being a low propensity.

The multiplicative result is used to create a new probability distribution by taking the row value divided by the column sum. The result would be a probability distribution for $(c:d)_1$ and $(c:d)_2$ similar to the following as executed by multiplication step 904:

TABLE 6

| Index | Keyword | Allocated Visits | Pageview Probability $p_i$ | Availability Check Probability $p_i$ | $(c:d)_3$ | $(c:d)_4$ |
|---|---|---|---|---|---|---|
| 1 | notel motels Chicago | 16 | 0.761451 | 0.827437 | 0.0358 | 949.3412 |
| 2 | notel motel in Chicago | 3 | 0.18236 | 0.145115 | 0.0141 | 949.3412 |
| 3 | chicago notel address | 2 | 0.056189 | 0.027448 | 0.0158 | 949.3412 |

These propensity values are referenced by the base for allocation of non-visit metrics within each block, similar to the original allocation of visits outlined in step 412. In table 6 above, Pageview and Availability Check probability distributions are ready for allocation. The quantity of Pageviews and Availability Checks to allocate within the block are already known.

Step 812 executes iteratively by performing the probabilistic assessment for the non-visits using the adjusted base and blocks. Instead of allocating visits for non-visit actions, the disclosed embodiments allocate c given d. This feature results in an allocation of non-visit metrics adjusted by the intent of the customer, weighted by the initial allocation of visits as seen in Table 6 as executed by allocation step 906 of FIG. 9.

The steps of qualification, multiplication, and allocation shown in FIG. 9 are repeated through the items of c in the dependency table until all values of $(c:d)_n$ have been allocated.

Step 814 executes by aggregating results to provide non-visit metrics to the estimated keywords. The sum of the non-visits in these results should be equal to the sum of the non-visits in the target. Results of non-visit estimation are integrated into a reporting system for dissemination, but are distinguishable from non-estimated results.

Figure 10:
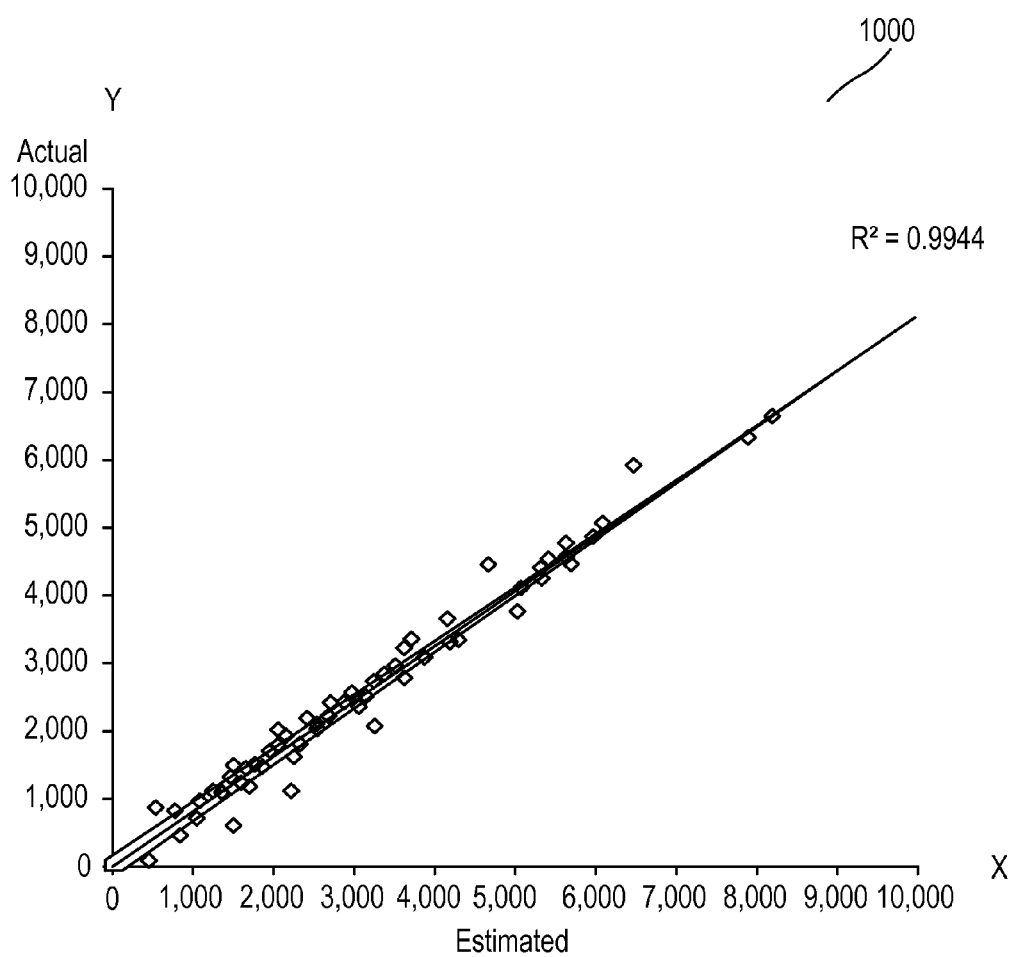
FIG. 10 illustrates a chart showing correlations between estimated keywords with the actual keywords according to the disclosed embodiments.

FIG. 10 depicts chart 1000 showing correlations between estimated keywords according to the disclosed embodiments and the actual keywords, as observed during a period prior to pervasive secure search. As shown, the x axis refers to the number of estimated visits using the disclosed embodiments including the processes above, and the y axis refers to the number of actual visits. The solid line represents a line of best fit using a linear least square method of the estimated keyword with the actual keyword. The estimated keyword or keywords for a visit are compared against the actual keyword or keywords. The estimated visits results yielded a 0.9944 R2 correlation with the actual keyword(s) used in the visit. These results are superior to deterministic estimates using known methods.

The disclosed embodiments may be supported and executed on a platform that has access to a network. The platform may support software and executable programs to provide the functionality disclosed above. For instance, the software may be deployed. Any software embodying the disclosed algorithm and its processes may be deployed by manually loading directly to the client, server and proxy computers via loading a storage medium such a CD, DVD, flash memory, chip, downloadable program and the like. The software also may be automatically or semi-automatically deployed into a computer system by sending the process software to a central server or a group of central servers. The software is downloaded into the client computers that execute the programs and instructions associated with the software.

Alternatively, the software may be sent directly to the client system via email. The software may be detached to a directory or loaded into a directory by a button on the email that executes a program that detaches the software into a directory. Another alternative is to send the software directly to a directory on the client computer hard drive. When there are proxy servers, the disclosed embodiments will select the proxy server code, determine on which computers to place the proxy servers' code, transmit the proxy server code, and install the proxy server code on the proxy computer. The software may be transmitted to the proxy server and then stored on the proxy server.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this specification, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more computer systems coupled to a network capable of exchanging information and data. These computer systems also may be general-purpose computer systems. Various functions and components of the computer system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for performing keyword estimation for encrypted searches in a secure sockets layer (SSL) environment, the method comprising:
    matching a target to at least one block, wherein the target includes a plurality of visits via the encrypted searches to a uniform resource locator (URL) address associated with the website;
    performing a probabilistic assessment on each of the plurality of visits of the target using the at least one block, wherein each visit is allocated to a category for the URL address within a block of the at least one block;
    determining at least one keyword used in the encrypted searches applicable to the URL address based on the allocated categories using the probabilistic assessments for each visit; and
    providing the at least one keyword via the encrypted searches with at least one non-estimated keyword for non-encrypted searches.

2. The method of claim 1, further comprising creating the at least one block using keyword data from one or more electronic sources.

3. The method of claim 2, further comprising receiving the keyword data from one or more electronic sources for searches outside the SSL environment.

4. The method of claim 2, wherein the creating step includes generating the category having a distribution within the block, wherein the category is associated with the keyword data.

5. The method of claim 4, further comprising determining a probability mass function for all categories within the block.

6. The method of claim 1, further comprising aggregating at least one result from the performing step for the at least one keyword.

7. The method of claim 1, further comprising estimating a quantity of non-visit metrics attributable to the URL address.

8. The method of claim 7, further comprising adjusting at least one category within the at least one block by propensities related to the non-visit metrics.

9. The method of claim 7, wherein the performing step includes performing the probabilistic assessment for non-visits within the target.

10. The method of claim 1, wherein the performing step includes assigning a random number to each visit of the plurality of visits.

11. The method of claim 10, further comprising determining the category for the visit within the at least one block according to the random number.

12. The method of claim 11, wherein the category corresponds to a keyword of the at least one keyword.

13. The method of claim 11, further comprising repeating the performing step for the visits corresponding to the target.

14. The method of claim 13, further comprising aggregating the categories from the determining step to determine the at least one keyword.

15. A method for estimating a keyword for a website receiving visits from encrypted search keywords in a secure sockets layer (SSL) environment, wherein each webpage of the website includes a uniform resource locator (URL) address, the method comprising:
receiving a plurality of visits from encrypted search keywords to the URL address of a webpage of the website;
matching the plurality of visits to a block based on similar attributes, wherein the block includes at least one category related to the URL address, each of the at least one category includes a probability value;
determining a random number for each visit;
determining an estimated keyword used in the encrypted searches for each visit based on the random number and the probability value of a category within the block; and
aggregating each estimated keyword from the second determining step to estimate at least one keyword for the plurality of visits.

16. The method of claim 15, further comprising creating the block from keyword data.

17. The method of claim 15, wherein the second determining step includes selecting a random index keyword for the estimated keyword.

18. A method for estimating a keyword for a plurality of visits to a website from encrypted search keywords in a secure sockets layer (SSL) environment, the method comprising:
assigning a random number to each visit of the plurality of visits, wherein each visit represents a view of a webpage of the website by selecting the URL address using encrypted search keywords;
comparing the random number to categories within a block related to the website;
determining an estimated keyword from a plurality of keywords for each visit according to a category corresponding to the random number, wherein the estimated keywords relate to encrypted search terms for the URL address; and
determining a probability distribution for the possible search terms for the URL address using the estimated keywords.

19. The method of claim 18, further comprising creating the categories within the block.

20. The method of claim 18, further comprising matching the visit to the block.

21. The method of claim 18, further comprising adjusting probabilities for the categories according to a non-visit metric.

22. A computer system for estimating a keyword for encrypted searches in a secure sockets layer (SSL) environment to a website, wherein the website includes a uniform resource locator (URL) address, the computer system comprising:
a processor;
a memory to store instructions executable on the processor;
a database configured to store keyword data from one or more sources;
a target corresponding to a plurality of visits to the website; and
a keyword estimation module supported by the processor and configured to
match a target to at least one block, wherein the target includes a plurality of visits via the encrypted searches to a uniform resource locator (URL) address associated with the website,
perform a probabilistic assessment on each of the plurality of visits of the target using the at least one block, wherein each visit is allocated to a category for the URL address within a block of the at least one block,
determine at least one keyword used in the encrypted searches applicable to the URL address based on the allocated categories using the probabilistic assessments for each visit, and
provide the at least one keyword via the encrypted searches with at least one non-estimated keyword for non-encrypted searches,
wherein the keyword estimation module includes a random number generator and an aggregator.

23. The computer system of claim 22, wherein the random number generator is configured to assign a random number to each visit.

24. The computer system of claim 22, wherein the aggregator is configured to aggregate the estimated at least one keyword for the visits to the website.

25. The computer system of claim 22, wherein the at least one category within the block is generated from the keyword data.

* * * * *